United States Patent [19]

Powell

[11] Patent Number: 4,810,020

[45] Date of Patent: Mar. 7, 1989

[54] HYDRAULIC SNUBBER FOR GRAPPLE AND METHOD

[75] Inventor: Harold W. Powell, Fall Creek, Oreg.

[73] Assignee: Esco Corporation, Portland, Oreg.

[21] Appl. No.: 164,516

[22] Filed: Mar. 7, 1988

[51] Int. Cl.[4] .............................. B66C 1/00; F16F 9/00

[52] U.S. Cl. .................................. 294/119.4; 188/381

[58] Field of Search ...................... 294/119.4, 86.4, 88; 188/72.4, 366, 367, 381; 414/626, 732, 733, 734, 735, 738, 739, 740; 37/183 R

[56] References Cited

U.S. PATENT DOCUMENTS 4,553,778 11/1985 Tyer ...................................... 294/88
4,572,567 2/1986 Johnson ............................ 294/119.4
4,573,728 3/1986 Johnson ............................ 294/119.4
4,609,081 9/1986 Hungerford ...................... 294/119.4
4,679,839 7/1987 Damron ............................ 294/119.4
4,717,191 1/1988 Farmer ............................. 294/119.4

*Primary Examiner*—James B. Marbert
*Attorney, Agent, or Firm*—Tilton, Fallon, Lungmus & Chestnut

[57] ABSTRACT

A hydraulic snubber for a skidding grapple employing an internal piston, the piston having associated therewith a line type seal to prevent leakage of pressure fluid against a friction disc and wherein the passage providing pressure fluid to the piston is equipped with a special fitting to prevent overload.

6 Claims, 2 Drawing Sheets

HYDRAULIC SNUBBER FOR GRAPPLE AND METHOD

BACKGROUND AND SUMMARY OF INVENTION:

This invention relates to a hydraulic snubber for a grapple and, more particularly, to a snubber including internally provided piston to assist in the snubbing action between the snubber housing and the associated clevises.

In the skidding of logs, a vehicle is provided having a rearwardly extending boom from which is suspended a grapple. The grapple requires freedom of movement in two mutually perpendicular vertical planes and this is provided by a housing equipped with shafts connected to the boom clevis at the top and the grapple clevis at the bottom. However, when the grapple is free, it requires snubbing against free pivotal movement otherwise it could cause injury to logging personnel and damage to the grapple itself by crashing into the boom. Therefore art workers have provided various kinds of snubbers and hydraulic snubbers have been particularly popular. One form of hydraulic snubber is seen in co-owned U.S. Pat. No. 4,609,081.

Also well known for a long time are snubbers with hydraulic "assists", i.e., pistons operating against confined friction discs in brake or clutch fashion. Normally, these have utilized an internal piston. These have been unsatisfactory because of leakage of the hydraulic fluid which could foul the friction disc and destroy or at least seriously inhibit the snubbing action. This has resulted in the provision of hydraulic-assist snubbers with external pistons as seen in U.S. Pat. Nos. 4,573,728 and 4,679,839.

However, the external piston variety also has problems; not only are they more complicated and therefore more expensive but there is a projection that can be damaged resulting in expensive down time of the grapple.

The instant invention provides an internal ring piston type of hydraulic assist grapple. The invention addresses and solves the problem of fluid leakage and the aggravation thereof resulting from the fact that workers in the field pump up the snubbers to great pressure which increases the chance of fluid leakage and also prevents the desired easy but restrained action of the grapple. These twin problems have been solved by the instant invention.

According to the instant invention, a novel passage is provided for the pressure fluid to move the internal piston and which incorporates a novel seal to prevent the undesirable leakage. The grease inlet fitting to the passage also provides for protection against excessive external pressure so as to minimize the chance of undesired leakage and also to restrict the degree of snubbing. Still further, the invention provides an arrangement where easy replacement of the friction discs is achieved.

Other objects and advantages of the invention may be seen in the detail of the ensuing specification.

The invention is described in conjunction with an illustrative embodiment in the accompanying drawing, in which FIG. 1 is a fragmentary elevational view of a skidding grapple;

DETAILED DESCRIPTION

Figure 1:
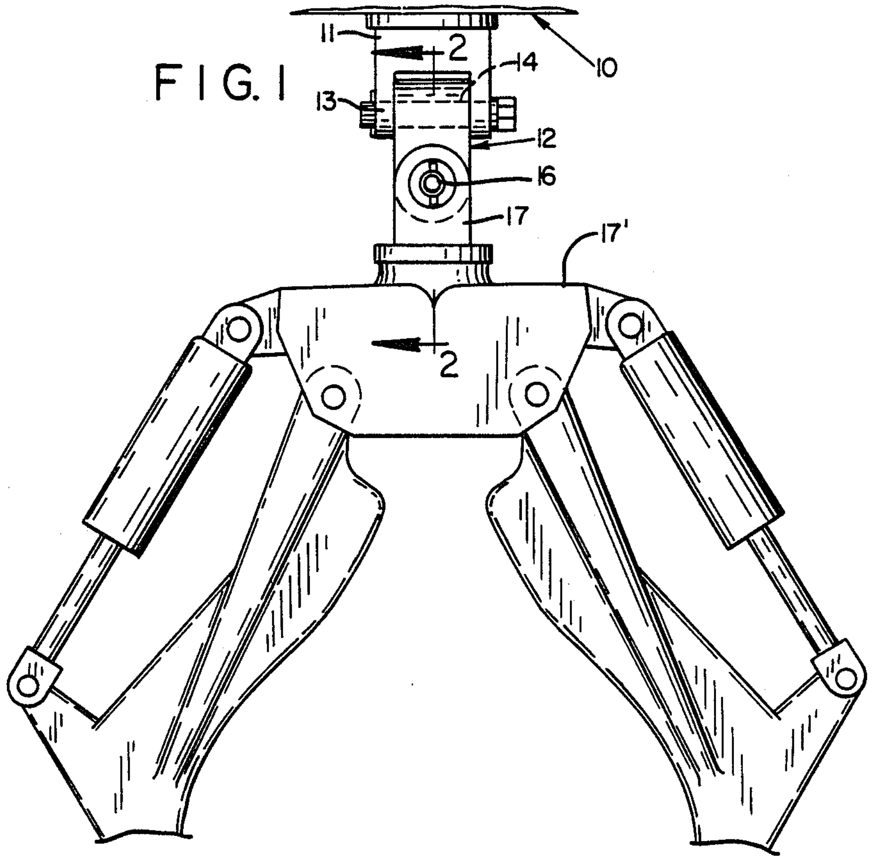

In the illustration given and with reference first to FIG. 1, the numeral 10 designates generally a boom which is shown only in fragmentary form. It will be appreciated that the basic environment of the snubber is well known and therefore details may be omitted. Depending from the boom 10 is a clevis 11 which supports a housing generally designated 12.

Figure 2:
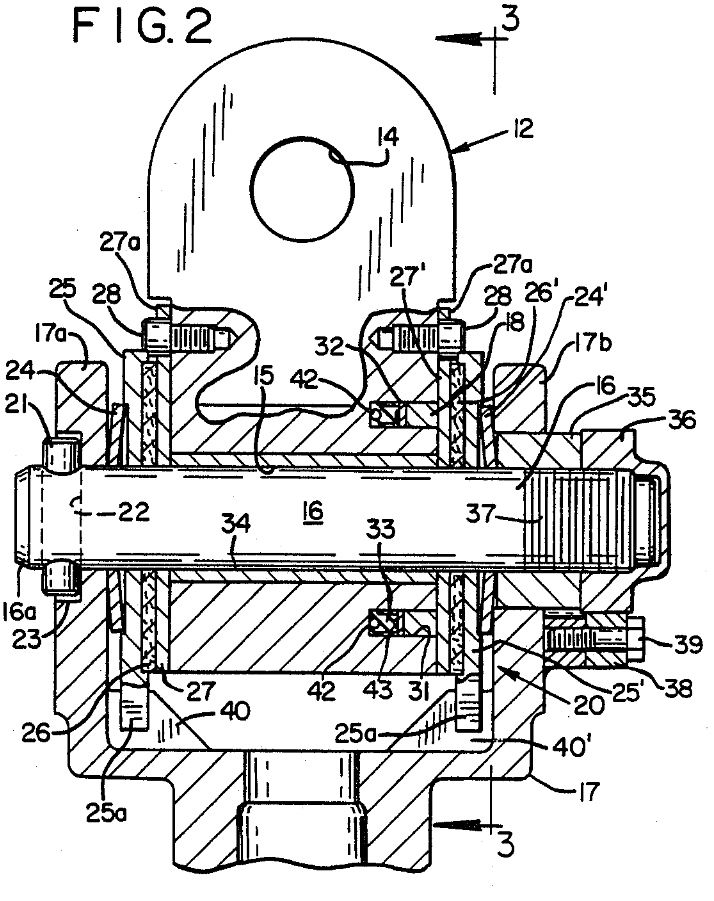
FIG. 2 is a fragmentary sectional view such as would be seen along the sight line 2—2 of FIG. 1.
Figure 3:
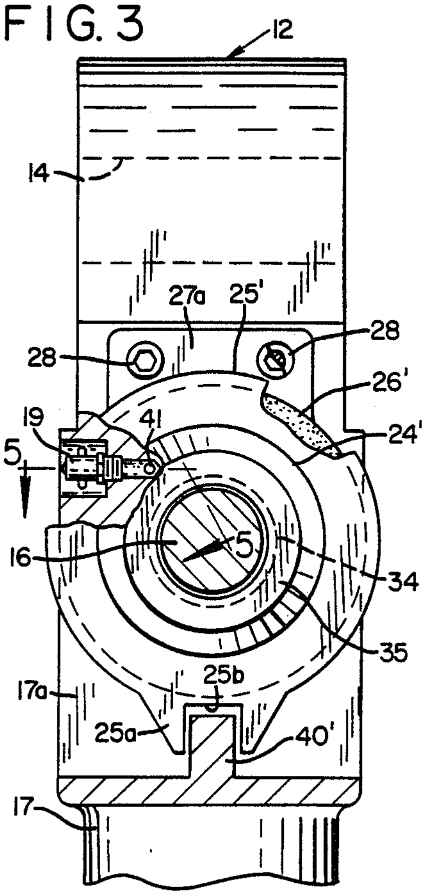
FIG. 3 is a side elevational view such as would be seen along the sight line 3—3 of FIG. 2 and with a portion in section.

More particularly, the clevis 11 rotatably supports a shaft 13 which extends through a through bore 14 in the housing 12—see also the upper portion of FIG. 2.

The housing 12 has a lower through bore 15—see the central portion of FIG. 2 which again supports a through shaft 16. The shaft 16 in turn is mounted within the grapple clevis 17 (again, see FIG. 2 in the lower portion thereof). In turn, the clevis 17 is fixed to a grapple 17'. The details of the grapple are not pertinent to this invention except insofar as the grapple provides an environment where control swinging is desired.

OPERATION GENERALLY

Referring again to FIG. 2, the numeral 18 designates an internal ring piston which is urged to the right by virtue of hydraulic pressure fluid introduced through the grease inlet fitting 19. This compresses a snubber assembly generally designated 20 interposed between the housing 12 and the clevis 17—see the upper and lower right hand corners of FIG. 2. More particularly, the compression or clamping of the snubber assembly 20 prevents rotation between the relative parts thereof so as to inhibit free rotation.

Figures 4, 5:
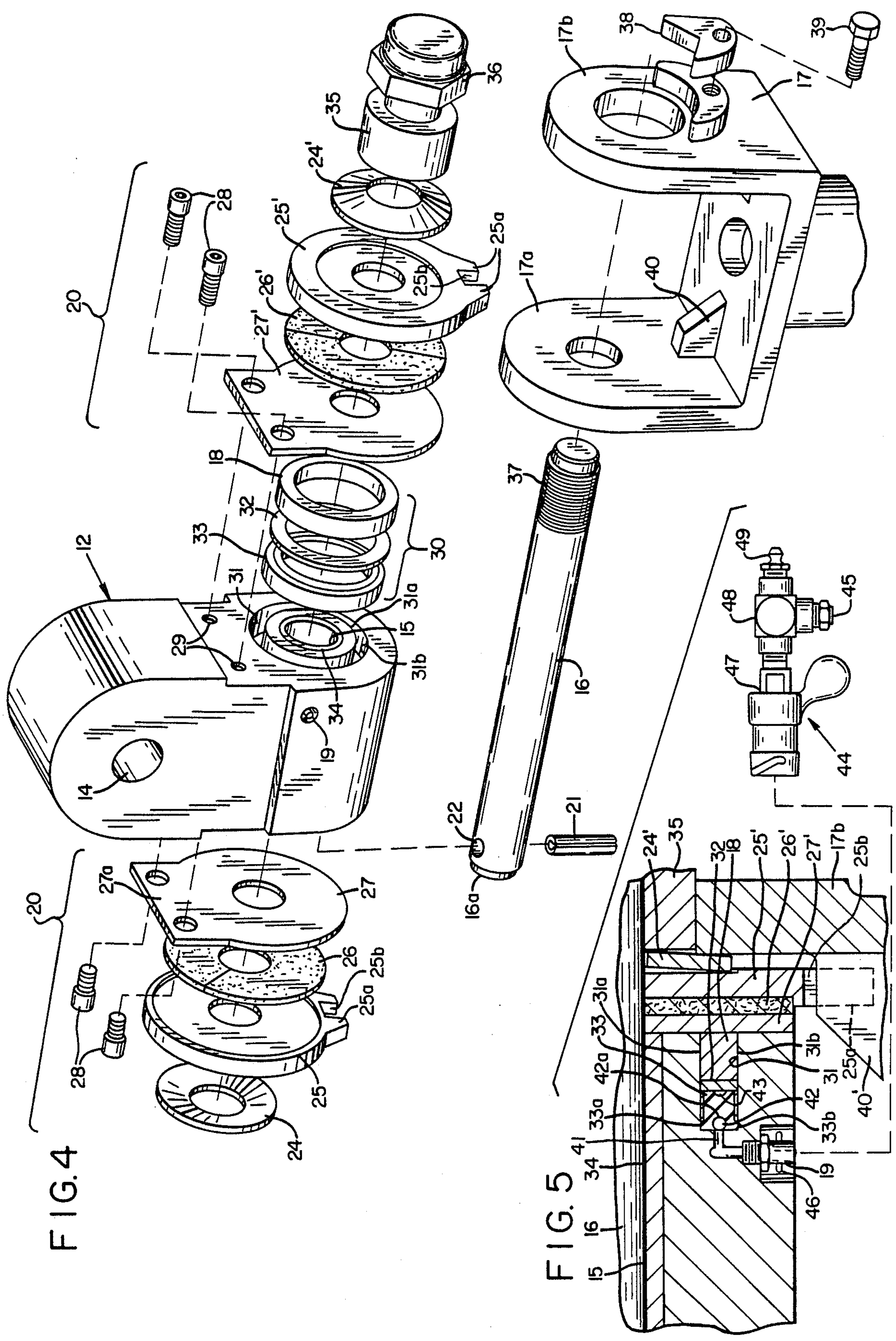
FIG. 4 is an exploded perspective view of the snubber housing of FIG. 2.
FIG. 5 is an enlarged fragmentary sectional view of the housing taken along the sight line 5—5 of FIG. 3 with a grease gun adapter shown in uncoupled relation.

The structure and operation can be appreciated more easily from a consideration of the exploded perspective view of FIG. 4. In the central upper portion thereof the housing 12 is pictured and the through bore 14 is also illustrated. In view of the fact that the snubbing arrangement is the same for both the upper through bore 14 and the lower through bore 15, only the latter will be described which makes understanding of the drawing easier.

Extending through the through bore 15 is the shaft 16 and which is rotatably received within the grapple clevis 17. Fixing the shaft 16 against movement to the right, i.e., movement of the left hand end 16*a* toward the housing 12 is a pin 21 extending through an opening 22 and which is received against the exterior of the left hand leg 17*a* of the clevis 17. More particularly, as can be seen from FIG. 2, the left hand leg 17*a* has a countersunk opening as at 23 in which the pin 21 is received.

Proceeding inwardly from the left hand leg 17*a*, i.e.,-toward the housing 12, the snubber assembly 20 includes a Belleville spring 24, a disc retainer 25, a split friction disc 26 and a wear plate 27. These elements 24–27 are ensleeved on the shaft 16 with appropriate center openings being provided as can be readily appreciated from the left hand side of FIG. 4.

An identical friction assembly is provided between the housing and the right hand leg 17*b* of the clevis 17 as can be appreciated from a consideration of the right hand portion of FIG. 4. There the right hand Belleville spring is designated 24', the disc retainer 25', the split disc 26' and the wear plate 27'. The Belleville springs are additionally advantageous in performing a hydraulic accumulator function. By storing energy, the springs, in effect, provide a reservoir for use when the friction discs begin to wear.

Rotation of the wear plates 27, 27' is restricted by virtue of an integral flanged part as at **27*a* (see the left hand portion of FIG. 4) through which bolts 28 extend into openings as at 29 in the housing 12**—see the right central portion of FIG. 4.

As mentioned previously, the piston is provided on only one side of the housing and this is again designated 18 in the right hand portion of FIG. 4. The ring piston 18 is part of a ring piston assembly generally designated 30 and which is received within an annular groove 31 having outer and inner walls **31*a* and 31*b***—designated in the lower central portion of FIG. 4.

The ring piston assembly includes in proceeding serially inward, the ring piston 18, an exclusion ring 32 and a seal 33. The annular groove 31 extends only partway into the housing 12 as can be appreciated from a consideration of FIG. 2. Also referring to FIG. 2, it will be seen that within the through bore 15, a bushing 34 is provided around the shaft 16 (see the central portion of FIG. 2).

Completing the right hand portion of the assembly on the shaft 16 is a tension spacer 35 which abuts the Belleville spring 24' and a nut 36 which is threadably received on the right hand end of the shaft 16—as on the threads 37, these shown in the lower central portion of FIG. 4. Completing the assembly is a nut locking mechanism 38, 39 seen in the lower right hand corner of FIG. 4.

Also seen in the lower right hand corner of FIG. 4 in the clevis 17 is an integral lug 40 which engages a slot provided in the integral extension **25*a* of the disc retainer 25. A similar lug 40' is provided for the disc retainer 25'**—see FIG. 2.

It will be seen that the disc retainers 25, 25' are countersunk on both sides—in the left hand portion of FIG. 4, it will be seen that there is a countersink in disc retainer 25 sufficient to receive the friction disc 26 while from a consideration of the disc retainer 25' at the right hand side, it will be seen that there is a countersink for receipt of the Belleville spring 24'.

In operation, it will be seen that when the ring piston 18 moves to the right, it compresses both the right hand and the left hand friction assemblies 20 so that the non-rotatable elements, i.e., the disc retainer 25, 25' and the wear plates 27, 27' engage the friction discs 26, 26' and inhibit rotation between the housing 12 and the clevis 17.

Referring to FIG. 5, it will be seen that the grease inlet 19 communicates with a fluid passage 41 which in turn communicates with the annular bore 31. Through this, pressure fluid engages the left hand face of the annular seal 33 (as seen in FIG. 4) which is enlarged at the left hand end by virtue of having an expander ring 42 mounted within a groove **42*a* therein—see FIG. 5. This provides a linear or line type seal between the inner and outer perimeter of the seal 33 and the inner wall of the annular bore 31 as at 33*a* and 33*b*. Additionally, a groove is provided in the outer face as at 43 (see also FIG. 5). This develops an annular bearing between the outer or right hand face of the seal 33 and the exclusion ring 32. This helps to stabilize the perimetric portion 33*a* at the inner or left hand end of the seal 33** so as to develop the advantageous linear seal which has been found particularly effective in preventing leakage of hydraulic fluid out of the housing and against the friction disc.

In addition, the exclusion ring is advantageous in preventing moisture and solid contaminants from entering the seal area. In its special position between the piston 18 and the seal 33, it provides a special barrier for exclusion of unwanted debris from being induced or propelled into the seal area under the reciprocatory motion of the piston 18.

Referring now to FIG. 5, the numeral 44 designates generally an adapter assembly which is employed to introduce hydraulic fluid into fitting 19—and thus into the system. With this special assembly it is now impossible to overload the system—a salient defect of prior hydraulic snubbers. In the invention, this is achieved by the provision of a pressure relief valve 45 in the assembly 44. The fitting 19 is equipped with pins as at 46 which prevents the use of a grease gun equipped with a standard nozzle. The use of a grease gun connected directly to the fitting 19 (bypassing the adapter assembly) would result in over pressuring the system. In the illustration given this is an Alemite P/N A336. It requires for coupling a slotted coupler 47 which, in the illustrated embodiment, is an Alemite P/N 50491. To this is connected a pipe tie 48 which carries the relief valve 45 and also a conventional zerk fitting 49. The zerk fitting is conventional for connection to a grease gun (not shown).

So when the user of the grapple wants to increase the snubbing force, he connects the adapter assembly 44 to the fitting 19 and then uses the grease gun by attaching the same to the zerk fitting 49. The assembly 44 is conveniently stored either in the cab of tractor carrying the grapple or in the parts box of the tractor. In this way, there is no possibility of overloading the hydraulic system which could either rupture seals causing the snubber to fail or to unduly restrict the necessary pivoting action of the clevises 11, 17.

It will be seen that the friction discs 26, 26' are half circular segments so that worn ones can be removed and new installed without disassembling the unit. The springs 24, 24' are relaxed by pushing in on the ball (not shown) in the end of the grease fitting 19 with a wire or nail to release the grease pressure; the nut 36 is backed off a few turns; the disc retainers 25, 25' pulled back to allow the old discs 26, 26' to drop out; new ones are installed and the system readjusted for proper load. The whole process only takes about 15 minutes.

While in the foregoing specification a detailed description of an embodiment of the invention has been set down for the purpose of illustration, many variations in the details hereingiven may be made by those skilled in the art without departing from the spirit and scope of the invention.

I claim:

1. A hydraulic snubber for a clevis-equipped boom suspending a clevis-equipped grapple comprising:
   - a housing equipped with an annular groove and an internal ring piston assembly therein, and a friction assembly compressible by pressure fluid induced movement of said piston assembly,
   - said ring piston assembly including in proceeding serially inwardly a ring piston, a contaminant exclusion ring and a pressure seal, a pressure passage in said housing connecting the inner end of said annular groove to the housing exterior, a hydraulic fluid check fitting on said housing exterior connected to said passage whereby fluid injected into said fitting is applied to said seal to move said ring piston outwardly against said friction assembly and inhibit rotation between said housing and an adjacent clevis, said seal including an annulus having inner and outer grooved faces, an expander 0-ring in said inner face groove forcing a perimetric portion of said seal into linear sealing engagement with the walls of said annular groove, said outer face groove providing an annular bearing between said seal outer face and said back-up plate to stabilize said perimetric portion in linear sealing relation to said annular groove.

2. The structure of claim 1 in which said friction assembly includes a split friction disc, and guided plate means flanking said disc.

3. The structure of claim 2 in which one of said glued plate means is equipped with means for guided movement on said clevis.

4. The structure of claim 1 in which said hydraulic fluid check fitting is equipped with external pin means for positively precluding connection of a grease gun directly thereto.

5. A hydraulic snubber for a clevis-equipped boom suspending a clevis-equipped grapple comprising:

a housing having an upper through bore and a lower through bore extending perpendicularly to said upper bore, an upper pivot shaft in said upper bore for pivotal mounting in said boom clevis and a lower pivot shaft in said lower bore for pivotal mounting in said grapple clevis whereby said grapple is adapted to pivot in two mutually perpendicular vertical planes relative to said boom, each shaft being equipped with a pin at one end external to its associated clevis to prevent said one shaft from moving axially toward said housing, each shaft at its other end being equipped with a tension spacer mounted in said clevis and a threaded nut to tension said shaft within said clevis, each shaft end between its associated clevis leg and said housing being equipped with a friction assembly including in proceeding serially inwardly a Belleville washer, a disc retainer, a split friction disc and a wear plate, said housing adjacent said other shaft end being equipped with an outwardly facing annular groove about said shaft and extending only partly inwardly into said housing, a ring piston assembly in said annular groove including in proceeding serially inwardly a ring piston, an exclusion ring and a seal, a pressure passage in said housing connecting the inner end of said annular groove to the housing exterior, a hydraulic fluid check fitting on said housing exterior connected to said passage whereby fluid injected into said fitting is applied to said seal to move said ring piston outwardly against said friction assembly and inhibit rotation between said housing and the adjacent clevis, said seal including an annulus having inner and outer grooved faces, an expander O-ring in said inner face groove forcing a perimetric portion of said seal into linear sealing engagement with the walls of said annular groove, said outer face groove providing an annular bearing between said seal outer face and said exclusion ring to stabilize said perimetric portion in linear sealing relation to said annular groove, said hydraulic fluid check valve fitting being equipped with external pin means for positively precluding connection of a grease gun directly thereto.

6. In a method of operating a grapple equipped with a hydraulic snubber, said snubber including a housing equipped with an annular groove and an internal ring piston therein, and a friction assembly compressible by pressure fluid induced movement of said piston assembly, said ring piston assembly including in proceeding serially inwardly a ring piston, a contaminant exclusion ring and a pressure seal, a pressure passage in said housing connecting the inner end of said annular groove to the housing exterior, a hydraulic fluid check fitting on said housing exterior connected to said passage whereby fluid injected into said fitting is applied to said seal to move said ring piston outwardly against said friction assembly and inhibit rotation between said housing and an adjacent clevis, said hydraulic fluid check fitting being equipped with external pin means for positively precluding attachment of a grease gun directly thereto, the steps of connecting an adapter assembly to said hydraulic fluid check fitting, said assembly including a pressure relief valve, thereafter connecting a grease gun to said assembly and introducing hydraulic fluid through said adapter assembly and check fitting into said pressure passage to build up pressure therein limited by the setting of said pressure relief valve, and thereafter disengaging said adapter assembly from said check fitting.

* * * * *